United States Patent Office 3,127,470
Patented Mar. 31, 1964

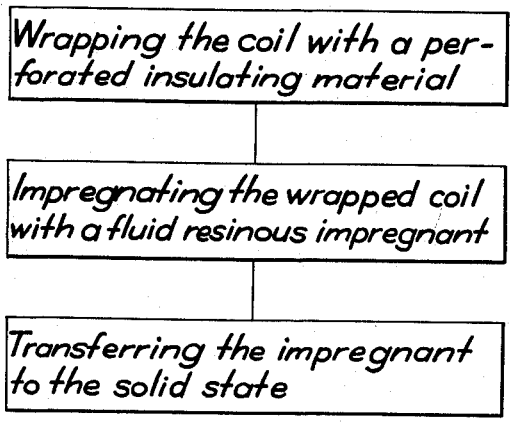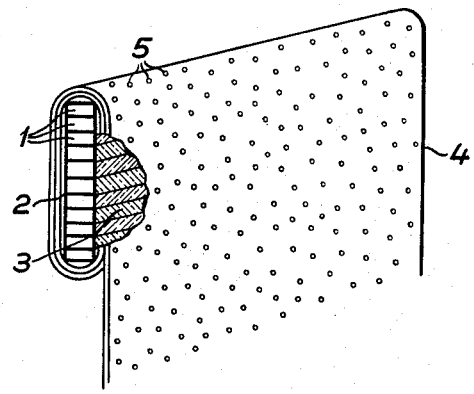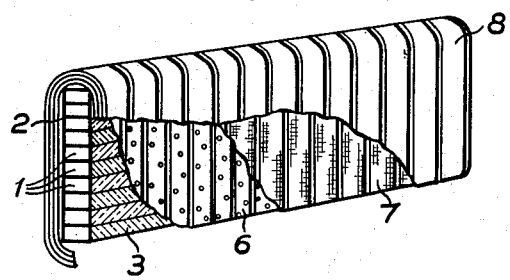

3,127,470
INSULATION FOR ELECTRICAL CONDUCTORS
Anders Ragnar Andersson and Knut Nylund, Vasteras, Sweden, assignors to Allmänna Svenska Elektriska Aktiebolaget, Vasteras, Sweden, a corporation of Sweden
Continuation of application Ser. No. 9,926, Feb. 19, 1960. This application Feb. 26, 1963, Ser. No. 261,179
Claims priority, application Sweden Feb. 24, 1959
3 Claims. (Cl. 174—121)

The present invention relates to an insulation for electrical conductors, especially for high voltage conductors.

This application is a continuation application of our copending application Serial No. 9,926, filed February 19, 1960, entitled "Insulation for Electrical Conductors," now abandoned.

It entails great difficulties to reach a complete filling of the insulation of a conductor, which consists of several layers of a tape or sheet formed insulation material wrapped around the conductor, by impregnation with a plastic material. Problems occurring will be further dealt with in conjunction with the following description of the manufacture of a group of products, high voltage coils being chosen as an example.

The manufacture of high voltage coils is often carried out in such a way that mica tape or mica sheet consisting of mica flakes which overlap each other and are attached to a tape or sheet formed backing, e.g., paper or cloth, is wrapped in several layers around bundles of conductors composed of individual conductors, after which the wrapped bundles of conductors are subjected to a further treatment usually consisting of an impregnation with an impregnant and a subsequent moulding of the insulation. Before this impregnation moisture and other volatile components are usually removed. The impregnation is made in order to fill voids and air spaces occurring in the insulation, and in this way, give the insulation good electrical and mechanical properties. To ensure that the filling is good, the impregnation is often made by a vacuum-pressure process and by using as an impregnant asphalt or a fluid solventless plastic material. Incomplete filling leads to internal discharges in the remaining voids of the insulation when the insulation is subjected to electric stresses. The discharges destroy the insulating materials and as a result, the insulation as well, at stresses which are essentially lower than that which the insulation should withstand if no voids existed. Punctures and other electrical faults thus occur after a considerably shorter time and at lower stresses in an incompletely filled insulation than in a completely filled one.

In spite of the use of vacuum-pressure during the impregnation, it has proved difficult to get a satisfactory penetration of the impregnant and so a good filling of voids occurring in the insulation. In order to bring forth a good penetration and filling, different steps have been suggested. Thus, it is known to use a material soluble in the impregnant as binder for the mica tapes and by this means make the penetration of the impregnant easier than if the binder was not influenced by the impregnant. The use of mica tapes in which the binder is volatile or can be volatilized by heat treatment, and so can be removed before the impregnation, is also known. Further, the use of mica tapes, in which the mica flakes are attached to the backing at various points has been suggested. In the processes described above, attention has thus been directed towards avoiding the use of binders in the mica tape, which binders hinder the penetration of the impregnants, through a suitable choice of binder or of method of attaching the mica flakes to the backing. It has also been suggested to use backings soluble in the impregnant to reach the intended effect.

Though binders and backings for the tapes in the described insulations have been adapted with the intention of facilitating the penetration of the impregnant, all insulations, however, have the disadvantage from the point of view of impregnation that they contain tapes or sheets which have layers of impervious mica flakes overlapping each other. These layers constitute, irrespective of the binders and backings which are integral parts of the tapes or sheets, a very great obstacle to the penetration of the impregnant, especially in the direction perpendicular to the plane of the tapes or sheets.

The same disadvantages from the point of view of impregnation are found with insulations which are built up of several layers of self-supporting or self-carrying mica sheets consisting of diminutive mica flakes which overlap each other and which are held together by molecular forces acting between the individual flakes. Also in such insulations the penetration of the impregnant is hindered by the foil formed insulating material built up of flakes, being in itself impervious.

The impregnation difficulties which have hitherto existed have, as a consequence, meant that for impregnation of insulations consisting of a great number of insulating material layers, only impregnants with an exceptionally low viscosity have in practice been usable. In order to make use of impregnants with higher viscosity possible it has been necessary to build up the insulation step by step to the desired thickness through a repeated procedure comprising wrapping on insulating material several times, a few layers at a time, with a subsequent impregnation after each such wrapping.

It is an object of this invention to provide a process for producing insulated conductors and coils having insulations comprising several consecutive layers of an insulating material and a resinous impregnant. Another object of the invention is to provide electrical conductors and coils with solid voidless insulation. A still further object of the invention is to provide conductors and coils with solid voidless insulations comprising mica and a solventless resinous impregnant. Another object of the invention is to provide a process for rapidly and economically impregnating an insulation applied to a conductor with a resinous impregnant. Other objects of the invention will appear hereinafter. For a better understanding of the invention, reference should be made to the following detailed description and drawings, in which:

FIGURE 1 is a schematic diagram of the process of this invention;

FIGURE 2 is a fragmentary perspective view of a coil being insulated according to the invention;

FIGURE 3 is a fragmentary perspective view of another coil insulated according to the invention.

The invention relates to a process for producing insulated high voltage conductors and coils comprising wrapping a conductor or a bundle of conductors with an insulating material which has been perforated in order to radically facilitate the penetration of an impregnant, and impregnating the wrapped conductor or coil with an impregnant. The invention refers to insulations with such insulating materials which in unperforated state are pervious only with difficulty, or impervious for the impregnant, such as, e.g., insulating materials containing layers of mica flakes overlapping each other. It has been proved that the dielectric strength of an insulation built up of several layers of an insulating material perforated in a suitable way, e.g., a perforated mica foil, is not lower than the dielectric strength of a corresponding insulation with unperforated insulating material. The use of a perforated insulating material makes it possible to use a lower pressure and a shorter time at the impregnation than is the case if corresponding unperforated insulating materials are used. Further the use of impregnants with a relatively high viscosity is made possible without, for this reason, it being necessary to build up insulation as before step by step to the desired thickness through a repeated procedure comprising wrapping on a few layers of material several times, and a subsequent impregnation after each such wrapping. Instead, all insulating material can be wrapped on in a single step to the desired insulation thickness before an impregnation of the insulation is made.

Referring now to FIGURE 1 of the drawing, there is a schematic illustration of the steps of the process according to the invention.

The following are special examples of processes for producing insulations described in connection with FIGURE 2 and FIGURE 3.

*Example 1*

A plurality of individual conductors 1, in this case ten conductors, form the coil or bundle 2. The conductors 1 which have a cross section of 12 x 3 mm., are insulated from each other in such a way that they are covered with glass fibre yarn 3 and impregnated with a binder, e.g., an epoxy resin such as "Araldit 15" with "Curing agent 15" from Ciba A.G., Switzerland, the proportion by weight of the ingredients of the resin being 100:30. The bundle of conductors 2 is wrapped in layers with a perforated 0.09 mm. thick mica sheet 4. The mica sheet consists of a self-supporting or self-carrying mica foil built up of diminutive mica flakes which overlap each other and which are held together by molecular forces acting between the individual flakes. The perforation has been performed by stamping out round holes 5 with 1 mm. diameter, whereby each square centimetre of foil area has three holes placed by chance. When the whole bundle of conductors in the described way, by wrapping in layers, has been provided with an insulation consisting of thirty consecutive mica foil layers, and finally with one layer of a 0.13 mm. thick and 30 mm. wide glass fibre tape without overlap acting as a protective tape for the mica foil, the wrapped coil is placed in an impregnating tank, where moisture and other volatile substances are first removed at a pressure of about 0.1 mm. Hg and at a temperature of about 40° C. for about 2 hours. The glass fibre tape is not shown in the figure. An impregnating resin consisting of 85 parts by weight of the epoxy resin "Araldit F," 100 parts by weight of "Curing agent 905," both from Ciba A.G., Switzerland, and 15 parts by weight of phenyl glycidyl ether is then introduced into the impregnating tank at the mentioned pressure, so that the coil is totally immersed in the resin. Thereafter a pressure of 5 kg./cm.² is applied with nitrogen gas for 4 hours. The temperature for impregnation is held at 40° C. The coil is then withdrawn from the impregnant and wrapped with 30 mm. wide and 0.05 mm. thick film tape of polyethylene terephthalate polymer with half overlap. The task of this tape, which is not shown in the figure, and which is practically impervious to the impregnant, is to prevent the impregnant leaving the insulation before curing and to act as release agent during the forming of the insulation which takes place in a mould at a temperature of about 160° C. and at a pressure of 3 kg./cm.² during a time for 4 to 6 hours. By this treatment the liquid resin is cured and transformed into a solid resin. After the curing of the resin, the impervious tape is removed from the coil. In FIGURE 2 the layers of mica foil wrapped around the bundle of conductors are partially removed in order that the individual conductors and their insulations will be visible.

The mentioned self-supporting mica sheet can be manufactured in a well-known way described in the U.S. Patent No. 2,549,880 and comprising splitting common mica by first heating it and then subjecting it successively to the action of two solutions capable of reacting upon each other so as to produce a disengagement of gas, thereafter placing the split mica in water to form a pulp of mica flakes, which is subjected to a further treatment according to a method similar to that used in the manufacture of paper. The mica sheet which is self-carrying, consists of incidentally arranged small mica flakes, overlapping each other and being bonded to each other by molecular forces acting between them.

*Example 2*

Referring to FIGURE 3, the high voltage coil 2 is composed of a plurality of individual conductors 1 each provided with insulation 3. The insulated conductors have been moulded in a hot press and formed into a bonded coil. The number of individual conductors is 20 and the cross section of each conductor 2.5 x 10 mm. The insulation of each conductor consists of a glass fibre covering and of a polyester resin of the same type as is used as impregnant for the insulation of the coil and described later. The coil is wrapped with 16 layers of an insulating tape 6 with half overlap. The insulating tape is composed of common, large mica flakes attached to a backing of paper, 0.03 mm. thick, with a binder consisting of an unsaturated polyester resin of the same type as the impregnant. The width of the tape is 25 mm. and the thickness 0.15 mm. The tape is perforated by stamping out, on an average, 3 holes with 1.4 mm. diameter per square centimetre of foil area. Over the insulating tape a layer of glass fibre tape 7 of the same type as in Example 1 is applied. The wrapped coil is subjected to resin impregnating process wherein the coil is first evacuated to remove all air and moisture therefrom and then an unsaturated polyester resin is applied to the evacuated coil to ensure complete impregnation. The coil is immersed in the resin at the pressure used at evacuating, 0.1 mm. Hg, and then a pressure of 5 kg./cm.² is applied. The temperature at impregnation is held at 40° C. and the time for the pressure-period is one hour. The polyester resin used for the impregnation is manufactured in the following way. Maleic anhydride, phthalic anhydride and propylene glycol in the proportion 2 moles of maleic anhydride, 1 mole of phthalic anhydride and 3.3 moles of propylene glycol are reacted in inert atmosphere under successive raising of the reaction temperature to 220° C., after which the temperature is maintained at this level until the acid number of the reaction product is 30. The reaction product is then added to diallyl phthalate in such an amount that the product so obtained contains 30 percent by weight of diallyl phthalate. Further, 1 percent by weight of benzoyl peroxide is added as a catalyst. After the coil has been withdrawn from the impregnant it is wrapped with an impervious polyethylene terephthalate tape 8 of the same kind and in the same way as described in Example 1. Thereafter the insulation is formed in a mould at a temperature of about 130° C. and at a pressure of 3 kg./cm.² for one hour. The impregnant is thereby cured and transferred into a solid resin. After the curing of the resin the impervious tape is removed from the coil.

*Example 3*

Instead of the self-supporting mica sheet described in Example 1 a 25 mm. wide and 0.09 mm. thick self-supporting mica tape having the same perforation as the above-mentioned sheet is used. The tape is applied in 15 layers with half overlap. Materials and manufacturing conditions are otherwise the same as in Example 1.

It is suitable to provide the mentioned self-supporting mica products with a backing in the form of fine glass fibre threads which are attached, e.g., with resinous binder, to the mica tape or sheet parallel to its longitudinal direction and which cover only a small part of the surface of the mica tape or sheet.

*Example 4*

Instead of the mica tape described in Example 2, a mica sheet having the same backing, binder and perforation as the mentioned tape, being as broad as the conductor bundle to be insulated is used. The sheet is applied in 32 layers. Materials and manufacturing conditions are otherwise the same as in Example 2.

*Example 5*

A 25 mm. wide perforated insulating tape 6, composed of a 0.09 mm. thick self-supporting mica foil built up of diminutive mica flakes overlapping each other and being held together by molecular forces, and of a 0.025 mm. thick polyethylene terephthalate film being a backing for the mica foil is used for insulating a coil in accordance with FIGURE 3. The perforation is made by stamping out holes with 1 mm. diameter, whereby each square centimetre of foil area has one hole placed by chance. The binder in the tape is the polyester resin described in Example 2. Each conductor of the coil is provided with an insulation consisting of a glass fibre covering and of the polyester resin described in Example 2. The number of individual conductors is 30 and the cross section of each conductor is 2.5 x 10 mm. The coil is wrapped with 12 layers of the insulating tape with half overlap and finally with glass fibre tape 7 as in Example 2. Air and moisture is removed in an impregnating tank at 10 mm. Hg and 40° C. for 2 hours. An unsaturated polyester resin is then introduced in the tank at the mentioned pressure so that the coil is totally immersed in the resin. Thereafter a pressure of 5 kg./cm.$^2$ is applied for one hour. The temperature is held at 40° C. The polyester resin is manufactured from maleic anhydride, sebacic acid and diethylene glycol by using the ingredients in the proportions 1 mole to 1 mole to 2.2 moles. The reaction conditions are the same as mentioned in Example 2 but the reaction is not stopped until the acid number has reached the value 25. To the reaction product is added monostyrene in such an amount that the content of monostyrene in the product obtained is 35 percent by weight. Benzoyl peroxide is added in an amount corresponding to one percent of the impregnant. After the coil has been withdrawn from the impregnant it is as before wrapped with a polyethylene terephthalate tape 8 and the insulation is formed during curing of the liquid resin in a mould under the same conditions as those mentioned in Example 2, after which the impervious tape is removed from the coil.

Depending on the type of conductor to be insulated, the use to which it is to be put, and the electrical and mechanical requirements, different tape or sheet formed insulating materials may be used, the number of wrapped layers of insulating material may be varied, and the number of holes per unit area and their diameter may be different. Also the choice of impregnant and the conditions for impregnating and curing will be different from case to case.

Besides insulations comprising consecutive layers of an insulating material containing mica layers, the invention comprises insulations built up of consecutive layers of other insulating materials pervious only with difficulty or impervious, e.g., thermoplastic film, such as polyethylene terephthalate film, polycarbonate film, cellulose triacetate film, etc. Self-supporting mica tape and sheet may be used as such, or with a suitable backing such as glass fibre threads and thermoplastic foils, mentioned earlier, as well as paper, glass fibre cloth, cotton cloth, etc. In mica tapes and sheets consisting of common, large mica flakes attached to a backing different material such as paper, glass fibre cloth, cotton cloth, asbestos cloth, asbestos paper, etc. may be used as backing. The mica flakes may be attached to the backing, e.g., with a resinous binder such as a saturated or unsaturated polyester resin, an epoxy resin, a phenolic resin, a silicon resin, an asphalt resin, shellac, etc. The mica flakes may also be mechanically attached to the backing, e.g., they may be sewn on the backing with sewing thread.

The holes are distributed over the tape or sheet shaped insulating material and the sum of the areas of the holes within the piece of the insulating material used suitably amounts to 0.2 to 10 percent, preferably 0.5 to 5 percent, of the area of the said piece of the insulating material in unperforated state.

Besides the described completely polymerizable impregnants many other commercially available unsaturated polyester resins and epoxy resins may be used, as well as many different binders for the glass fibres covering the individual conductors of a coil. Although many unsaturated polyester resins and epoxy resins suitable for the impregnation of electrical insulations are well-known, some further examples of such resins may be mentioned, so an impregnant consisting of 60 parts by weight of a reaction product of 3 moles of maleic anhydride, 1 mole of adipic acid, 4.4 moles of ethylene glycol, manufactured according to the process described earlier, and with an acid number of 30, and of 40 parts by weight of diallyl phthalate, and containing 0.75 percent of benzoyl peroxide may be used as well as an impregnant consisting of 70 parts by weight of a reaction product of 1 mole of fumaric acid, 1 mole of phthalic acid and 2.2 moles of propylene glycol reacted to an acid number of 25, and of 30 parts by weight of monostyrene, and containing 0.5 percent of benzoyl peroxide. Among suitable epoxy resins may be mentioned a product consisting of 100 parts by weight of the epoxy resin, Epon 820 from Shell Chemical Co. and of 65 parts by weight of hexahydrophthalic anhydride and a product consisting of 100 parts by weight of the epoxy resin Dow 331 from Dow Chemical Co. and of 65 parts by weight of tetrahydrophthalic anhydride. As impregnants further different types of other resins, both natural resins such as, e.g., asphalt, and synthetic resins usually used as impregnants, may be used with or without added solvents.

By using asphalt without a solvent as an impregnant, the impregnation is performed at a temperature above the melting point of the asphalt, and the insulation may suitably be formed in a mould in which the asphalt is transferred to a solid state.

It is obvious to those skilled in the art that a coil to be insulated need not, as the coil described in Examples 1 to 5, consist of a bundle of individual conductors, but may just as well consist of only one conductor.

We claim:

1. An insulated high voltage coil comprising at least one conducting member, at least twelve layers of an insulating tape comprising a mica tape provided with perforations and having a woven glass fibre backing layer, wrapped around the conductor, the sum of the areas of the perforations being from 0.2 to 10 percent of the total area of the mica tape, and a solid resin derived from a liquid resinous composition applied to the electrical conductor and the wrappings thereon to impregnate the wrapping and to bond the whole into a solid member.

2. An insulated high voltage coil comprising, in combination, an electrical conductor comprising at least one conducting member, at least twelve layers of an insulating tape comprising a self-supporting mica tape built up of diminutive mica flakes which overlap each other and which are held together by molecular forces acting between them, and having a woven glass fibre backing layer, wrapped around the conductor, the mica tape being provided with perforations the sum of the areas of which is from 0.2 to 10 percent of the total area of the mica tape, and a solid resin derived from a liquid resinous composition applied to the electrical conductor and the wrappings thereon to impregnate the wrappings and to bond the whole into a solid member.

3. An insulated high voltage coil comprising, in combination, an electrical conductor comprising at least one conducting member, at least twelve layers of an insulating tape comprising a mica layer having overlapping mica flakes and having a woven glass fibre backing layer, wrapped around the conductor, the mica layer being provided with perforations the sum of the areas of which is from 0.2 to 10 percent of the total area of the mica tape, and a solid resin derived from a liquid resinous composition applied to the electrical conductor and the wrappings thereon to impregnate the wrappings and to bond the whole into a solid member.

References Cited in the file of this patent

UNITED STATES PATENTS

| | | |
|---|---|---|
| 1,730,740 | Morrison | Oct. 8, 1929 |
| 2,656,290 | Berberich et al. | Oct. 20, 1953 |